United States Patent [19]

Hidaka et al.

[11] Patent Number: 5,089,177
[45] Date of Patent: Feb. 18, 1992

[54] 1,3-SELECTIVE ESTERIFICATION OF SOFT PALM OIL AND LAVRIN FATS/OILS

[75] Inventors: Hiroshi Hidaka; Nobuo Sagi, both of Sakai, Japan

[73] Assignee: Fuji Oil Company, Limited, Osaka, Japan

[21] Appl. No.: 450,152

[22] Filed: Dec. 13, 1989

[30] Foreign Application Priority Data

Oct. 15, 1988 [JP] Japan ................... 63-318199

[51] Int. Cl.⁵ .............................. C09F 5/08
[52] U.S. Cl. ................................. 260/410.6
[58] Field of Search .................. 260/410.6, 410.7

[56] References Cited

FOREIGN PATENT DOCUMENTS 63-198992 8/1988 Japan .

OTHER PUBLICATIONS

Chemical Abstracts, vol. 111, p. 519, 1989, 22440f.
Chemical Abstracts, vol. 102, pp. 434, 438, 1985, 4646n.
Chemical Abstracts, vol. 77, p. 317, 1972, 112731k.

Primary Examiner—Jose G. Dees
Assistant Examiner—Deborah D. Carr
Attorney, Agent, or Firm—Wenderoth, Lind & Ponack

[57] ABSTRACT

Fats and oils suitable for a starting material of emulsified food which is exposed to a low temperature are produced by subjecting a mixed oil containing soft palm oil and a laurin fat or oil in an amount of 1/10 to 3/2 times that of the palm oil to 1,3-selective ester interchange.

5 Claims, No Drawings

1,3-SELECTIVE ESTERIFICATION OF SOFT PALM OIL AND LAVRIN FATS/OILS

FIELD OF THE INVENTION

The present invention relates to a process for production of fats and oils. More particularly, the fats and oils of the present invention are produced by using a fractionated palm oil and a laurin fat or oil as main starting materials, and are suitable for production of emulsified food which maintains a stable emulsified state when stored or stirred at a low temperature.

BACKGROUND OF THE INVENTION

Liquid oils used as main starting materials for salad oils and the like, for example, soybean oil, rapeseed oil, corn oil, rice oil, cottonseed oil, safflower oil, kapok oil, peanut oil, sunflower oil and the like, are cheaper than so-called vegetable butter such as cacao butter, shea butter, sal fat and the like. However, in general, they are more expensive than palm oil and its fractionated oils. Accordingly, there have been many proposals aimed at reduction of cost of starting fats and oils of salad oils by using palm oil or fractionated oils thereof as a part of the starting materials.

These proposals include Japanese Patent Laid Open Publication Nos. 107304/1974, 63403/1978 (WPI Acc No. 78-50744A/28), 110246/1985 (WPI Acc No. 85-181373//30), 293389/1986 (WPI Acc No. 87-039021/06), 296096/1986 (WPI Acc No. 87-040195/06) and the like. Among them, the specification of Japanese Patent Laid Open Publication No. 198992/1988 (WPI Acc No. 88-273897/39) describes that there are various drawbacks in most of these prior arts.

Further the description of Japanese Patent Laid Open Publication No. 198992/1988 itself proposes a process for production of a liquid oil comprising subjecting a mixture of a solid fat such as palm oil, palm stearin, palm olein or the like and a liquid oil such as rapeseed oil, palm fractionated liquid oil or the like to enzymatic ester interchange with a lipase having 1,3-selectivity as a catalyst. As the "keystone" of the proposal, this patent application asserts that selective ester interchange results in decrease in triglycerides containing two or more saturated fatty acids, that is, decrease in triglycerides of SSS and SSU (S and U used herein mean a saturated fatty acid residue and an unsaturated fatty acid residue constituting glycerides, respectively; this expression does not limit the position of bonding of the residues) and, thereby, low-temperature resistance must be improved. Further, the application discloses that, after ester interchange, the conventionally required fractionation operation is almost unnecessary.

Thus, palm oil, even a low-melting point fraction known as palm olein, contains a solid component and, in order to use the oil as a part of the starting materials of liquid oil products, it is necessary to improve its low-temperature resistance. In this respect, according to the present inventors' knowledge, the problem of "turbidity" produced after storage at a low temperature is not yet solved by the method of Japanese Patent Laid Open Publication No. 198992/1988.

The present inventors have also studied fats and oils obtained by mixing palm olein with a liquid oil and subjecting the mixture to 1,3-selective ester interchange, and recognized that the process, wherein palm oil and a liquid oil are compounded and 1,3-selective ester interchange is carried out, is not suitable for the production of a salad oil. This recognition is based on the following present inventors' finding:

(1) The ester interchanged oil obtained is inevitably accompanied with problems of causing turbidity upon storage at a low temperature for a long period of time and, in addition, causing oil separation due to demulsification when mayonnaise is produced by using the resulting salad oil and stored in a refrigerator;

(2) When the microscopic observation of the ester interchanged oil itself was conducted after standing at 5° C. for about one month to investigate the cause of demulsification, coarse needle crystals grown like bursa of chestnut were found. These crystals are supposed to cause destruction of the interface; and (3) Even in the case of the ester interchanged oil obtained by using palm olein, the existing SSU level is not low. On the contrary, SSS content is rather increased after ester interchange.

The present inventors have an idea that, although removal of a crystallized component which causes turbidity is inevitable unless post-fractionation is conducted, modification of crystals of an ester interchanged oil can be employed in order to use the oil in the production of an emulsified food such as mayonnaise to prevent demulsification due to storage at a low temperature, rather than removal of the crystallized component (i.e., the use as a salad oil) which entails higher expenditure. The present inventors have done various studies based on this idea. As a result, it has been found that, by subjecting palm olein and a laurin fat or oil to ester interchange, growth of coarse crystals can be efficiently inhibited and the ester interchanged oil obtained can be used for emulsified food which is exposed to a low temperature while preventing demulsification, although the amount of crystals produced is not necessarily decreased and, on the contrary, the melting point and cloud point thereof are raised.

OBJECTS OF THE INVENTION

The main object of the present invention is to provide a process for production of cheap fats and oils which do not require any fractionation operation to remove a crystallized component in the final step of the process and can produce fats and oils whose crystals produced during storage in a refrigerator remain fine. In other words, the main object of the present invention is to provide a process for production of cheap fats and oils suitable for production of emulsified food which is free from demulsification upon storage in a refrigerator.

This object as well as other objects and advantages of the present invention will become apparent to those skilled in the art from the following description.

SUMMARY OF THE INVENTION

According to the present invention, there is provided a process for production of fats and oils which comprises subjecting a mixed oil containing soft palm oil and a laurin fat or oil in an amount of 1/10 to 3/2 times that of the palm oil to 1,3-selective ester interchange.

DETAILED DESCRIPTION OF THE INVENTION

The starting oil to be subjected to ester interchange treatment is a mixed oil containing soft palm oil and a laurin fat or oil. The amount of the laurin fat or oil is 1/10 to 3/2 times the weight of the soft palm oil.

The iodine value of the soft palm oil is generally not less than 55. When it is lower than this value, the amount of crystals in the fats and oils produced becomes too high. Among commercially available materials, there can be used those commonly known as palm olein as soft the palm oil. However, in general, a low-melting point fraction obtained by fractionation of palm oil to remove a high-melting point fraction can be used. As the method for fractionation, for example, solvent fractionation, fractionation using surface active agents or dry (solvent-free) fractionation can be employed. Of course, soft palm oil which has been subjected to more than two fractionation steps can be used. However, in the present invention, it is sufficient to use palmsoft oil obtained by one-step fractionation.

The laurin fat or oil used in the present invention is a fat or oil containing 30% by weight or more of lauric acid and there can be used palm kernel oil, coconut oil, babassu oil and the like. However, in order to suppress the amount of crystals, the low-melting point fractions obtained by fractionation of these oils are preferred.

It is considered that, by carrying out ester interchange of palm olein with a laurin fat or oil, mixed acid triglyceride molecules containing both fatty acid residues mainly composed of those having 16 and 18 carbon atoms derived from the former and fatty acid residue mainly composed of that having 12 carbon atoms derived from the latter are formed, which prevents growth of crystals, although the amount of crystals produced is not necessarily decreased and, on the contrary, the melting point and cloud point are rather raised.

The mixed oil containing soft palm oil and the laurin fat or oil may further contain a liquid oil in an amount of not less than 1/10 time, preferably, not less than 1/5 time the weight of the soft palm oil. The use of such a liquid oil can decrease the amount of crystals, but it is not effective to decrease the size of crystals. As the amount of such a liquid oil becomes larger, the merit for reducing cost becomes lesser. Then, usually, it is preferred to use such an oil, at most, in the amount of 1/2 time the weight of the soft palm oil. Examples of such a liquid oil include the above-described soybean oil, rapeseed oil, corn oil, rice oil, cottonseed oil, safflower oil, kapok oil, peanut oil, sunflower oil and the like which are used as main starting materials of a salad oil and the like, and slightly hydrogenated oils thereof.

The above mixed oil may further contain fats and oils containing other longer chain fatty acids of different chain lengths, for example, those having 20 or more carbon atoms as constituent fatty acids.

The above mixed oil is subjected to 1,3-selective ester interchange treatment. A 1,3-selective lipase or lipase preparation and methods for ester interchange using them are known and described in, for example, Japanese Patent Laid Open Publication Nos. 104506/1977, 71797/1980, 84397/1980, 127094/1981, 163196/1981, 78496/1982, 500649/1984, 19495/1985 and the like. It is preferred to carry out ester interchange under such conditions that water in the reaction system is reduced as little as possible to prevent formation of by-products.

As the fats and oils obtained by the present invention are not intended to be used for salad oils, they do not require fractionation after the ester interchange reaction. The fats and oils obtained by the present invention alone or in combination with other fats and oils can be used for production of emulsified food which can be stored in a refrigerator, as well as food materials which hardly cause demulsification upon stirring. Particularly, the fats and oils obtained by the present invention can be used as raw materials for production of acidic oil-in-water type creams, for example, dressings such as mayonnaise, cream cheese type food and the like and show remarkable effect for preventing demulsification upon storage at a lower temperature for a long period of time, stirring or the like. The amount of the fats and oils to be used varies depending on the particular food. However, even in the case of using the fats and oils obtained by the present invention as those for mayonnaise which are conventionally required to be a liquid oil as a whole, they can be used in an amount of 30 to 50% by weight based on whole fats and oils for mayonnaise in terms of the sum of soft palm oil and the laurin fat or oil to be subjected to ester interchange.

The following Examples further illustrate the present invention in detail but are not to be construed to limit the scope thereof. All percents are by weight unless otherwise stated.

EXAMPLE 1

The commercially available palm olein ("Unibar 100" sold by FUJI OIL CO., LTD.; iodine value: 56.5) was mixed with palm kernel olein ("PK-Ace 200 sold by FUJI OIL CO., LTD.; iodine value: 26.0) in various ratios and, according to the conventional enzymatic ester interchange method, 1,3-selectively ester interchanged fats and oils were obtained. The melting points (softening points) of starting mixed oils and the resulting ester interchanged oils, cloud points (AOCS method) after addition of rapeseed oil (iodine value: 117) in the amount of 70% by weight based on the total amount, and the size of crystals (microns) which were noticeable upon microscopic observation after storage at 5° C. for 30 days were determined. The results are shown in Table 1.

TABLE 1

| Compounding Ratio*1 | Melting Point (°C.) | | Cloud Point (°C.) | | Size of Crystals*2 | |
|---|---|---|---|---|---|---|
| | M | E | M | E | M | E |
| 100/0 | 17.2 | 28.7 | | 3.2 | >> | 120-150 |
| 90/10 | 16.1 | 26.2 | -3.3 | 2.4 | >> | 80-100 |
| 80/20 | 15.8 | 21.0 | -6.5 | 1.8 | >> | 60-80 |
| 70/30 | 14.0 | 20.2 | -9.8 | 0.4 | >> | 40-60 |
| 50/50 | 15.0 | 20.9 | -9.0 | 1.7 | >> | 40-60 |
| 30/70 | 16.9 | 21.3 | -7.3 | 1.8 | >> | 80-100 |

*1 the weight ratio of palm olein/palm kernel olein
*2 the size after addition of rapeseed oil and storage at 5° C. for 30 days, and ">>" means the coarseness which can be clearly observed by the naked eye.
M and E mean the starting mixed oil and the resulting ester interchanged oil, respectively.

As seen from Table 1, when the liquid oil (rapeseed oil) was added to the starting mixed oil without ester interchange and the mixture was stored at 5° C., coarse crystals of the size of about 1 to 5 mm which can be clearly observed by the naked eye are present. On the other hand, in the case of the ester interchanged oil of palm olein and palm kernel olein, the size of noticeable crystals is 100 microns or less even after storage at 5° C. for 30 days, although the melting point and cloud point are raised in comparison with the starting mixed oil without ester interchange. When the compounding ratio is 70/30 to 40/60, the crystal size is minimized.

EXAMPLE 2

According to the same manner as described in Example 1, ester interchanged oils were obtained except that, in addition to palm olein and palm kernel olein, rapeseed oil was mixed in various ratios and the mixture was subjected to ester interchange. The cloud point of fats and oils obtained by addition of 70% by weight of rapeseed oil based on the total amount to the resulting ester interchanged oils, the size of crystals (microns) after storage at 5° C. for 30 days and the content of solid fats (measured by NMR after storage at 5° C. or 10° C for 10 days in a tube for NMR model SFC-900) were determined. The results are shown in Table 2.

TABLE 2

| Compounding Ratio[*1] | Cloud Point (°C.) | Size of Crystals[*2] | Content of Solid Fats[*3] | |
|---|---|---|---|---|
| | | | 5° C. | 10° C. |
| 90/10/0 | 2.4 | 80–100 | 27.1 | 15.2 |
| 81/9/10 | 1.3 | 80–100 | 23.4 | 13.0 |
| 63/7/30 | 0.3 | 70–90 | 16.9 | 10.8 |
| 70/30/0 | 0.4 | 40–60 | 18.8 | 7.2 |
| 63/27/10 | −0.7 | 40–60 | 16.0 | 6.5 |
| 49/21/30 | −1.5 | 30–40 | 12.5 | 5.3 |

[*1] the weight ratio of palm olein/palm kernel olein/rapeseed oil used for ester interchange
[*2] size after addition of rapeseed oil and storage at 5° C. for 30 days
[*3] ester interchanged oil As seen from Table 2, although the amount of rapeseed oil added to the starting oils to be subjected to ester interchange is increased, the effect on the size of crystals is relatively little. On the other hand, the content of solid fats can be decreased.

EXAMPLE 3

Mayonnaise was produced by using either the starting mixed oil without ester interchange or its ester interchanged oil as described in Example 1 having the compounding ratio of 30/70 (70%) together with liquid egg yolk (15%), vinegar (acidity: 5%), salt (3%), sodium glutamate (1%), mustard powder (1%). After mixing these ingredients, the mixture was fed to an emulsifier to obtain mayonnaise. The mayonnaise was filled in 200 ml glass bottles and stored in a chamber at −5° C. for a week, and oil separation was observed after being exposed at room temperature. As a result, oil separation was observed in the mayonnaise produced by using the starting mixed oil without ester interchange, while no oil separation was observed in the mayonnaise produced by using the ester interchanged oil.

As described hereinabove, the fats and oils obtained according to the present invention do not require any fractionation operation in the final step and, further, the crystals formed by exposure to a low temperature remain fine. Thus, they can be preferably used as a starting material for emulsified food which is exposed to a low temperature to prevent demulsification thereof.

What is claimed is:

1. A process for production of fats and oils which comprises subjecting a mixed oil containing soft palm oil having an iodine value of not less than 55 and a laurin fat or oil in an amount of 1/10 to 3/2 times that of the palm oil to 1,3-selective ester interchange.

2. A process according to claim 1, wherein the laurin fat or oil is a fat or oil containing at least 30% by weight of lauric acid.

3. A process according to claim 1, wherein the mixed oil further contains a liquid oil in an amount of not less than 1/10 time the weight of the soft palm oil.

4. A process according to claim 3, wherein the amount of the liquid oil is 1/5 to 1/2 time the weight of the soft palm oil.

5. A process according to claim 3, wherein the liquid oil is rapeseed oil.

* * * * *